US007252732B2

(12) United States Patent
Karolyi

(10) Patent No.: US 7,252,732 B2
(45) Date of Patent: Aug. 7, 2007

(54) PROCESS AND APPARATUS FOR APPLYING RIGIDITY STRIPS TO A FOIL WEB

(75) Inventor: Oskar Karolyi, Bad Boll (DE)

(73) Assignee: Ruediger Haaga GmbH, Donzdorf (DE)

( * ) Notice: Subject to any disclaimer, the term of this patent is extended or adjusted under 35 U.S.C. 154(b) by 281 days.

(21) Appl. No.: 10/808,596

(22) Filed: Mar. 25, 2004

(65) Prior Publication Data

US 2004/0244900 A1 Dec. 9, 2004

(30) Foreign Application Priority Data

Mar. 27, 2003 (DE) ................................ 103 14 688

(51) Int. Cl.
*B32B 37/00* (2006.01)

(52) U.S. Cl. ................... 156/204; 156/304.8; 156/469; 156/553

(58) Field of Classification Search ................ 156/199, 156/204, 459, 469, 543, 553, 308.4
See application file for complete search history.

(56) References Cited

U.S. PATENT DOCUMENTS 4,522,676 A * 6/1985 Masao ........................ 156/443
4,557,713 A * 12/1985 Savich ........................ 493/194

OTHER PUBLICATIONS

Packaging Strategies, Japanese Pouches Are 'Stand Outs' Among Alternative U.S. Options, p. 4, Nov. 30, 2002.

* cited by examiner

*Primary Examiner*—Richard Crispino
*Assistant Examiner*—Barbara J. Musser
(74) *Attorney, Agent, or Firm*—Crowell & Moring LLP

(57) ABSTRACT

A process and apparatus are provided for applying double-layered rigidity strips to a sealable foil web which is transported in sequences. V-shaped loops are formed at predetermined foil sections set at a distance from one another in the web transport direction. The sides of the loops are subsequently sealed together in such a way that the thus formed rigidity strips, extending transversely to the direction of transport, project collar-like from the foil web. Each foil section at which a loop is formed, a controlled auxiliary loop is arranged which serves for adaptation to changes in format regarding the distances between the foil sections. A drum, having a relatively large diameter serves as a transport roller, which drum has devices arranged around its circumference for the purpose of forming a plurality of loops and auxiliary loops.

18 Claims, 3 Drawing Sheets

1
2
3
4
5
6
7
8
9
A
x
III

PROCESS AND APPARATUS FOR APPLYING RIGIDITY STRIPS TO A FOIL WEB

BACKGROUND AND SUMMARY OF THE INVENTION

This application claims the priority of German Application No. 103 14 688.1 filed on Mar. 27, 2003, the disclosure of which is expressly incorporated by reference herein.

The present invention relates to a process for applying double-layered rigidity strips to a sealable foil web, which is transported in sequences, whereby V-shaped loops are formed at predetermined foil sections set at a distance from one another in transport direction, and whereby the sides forming the loops are sealed to one another so that the then formed rigidity strips, extending transversely to the transport direction, project collar-like from the foil web.

From an article in the magazine Packaging Strategies dated Nov. 30, 2002, a new type of packaging pouch with the name EdgeStand is known, which is manufactured from a sealable foil web and which is provided around its entire bottom edge with a rigidity strip. This rigidity strip enables the pouch to stand on an even surface and even to be stacked. The rigidity strip is folded onto the pouch and is double-layered. There is no information provided in the article on the method of production, but the applied process is known to the applicant of the present invention through prior notorious use. The folding of the double-layered rigidity strips onto the foil web hereby occurs along a plane transport path, along which the elements required for carrying out the process are adapted to a predetermined format of the packaging pouch to be made. In the case of products with other formats, in particular in the case of varying distances between the foil sections to be folded, different function elements must be fitted in a complicated process.

It is an object of the present invention to avoid time-consuming retrofitting of the function elements in a process of the type described above.

This object has been achieved in accordance with the present invention in that a controlled auxiliary loop is arranged at each foil section on which a loop is formed, said auxiliary loop serving the adaptation to format changes regarding the distances between the foil sections.

An auxiliary loop of this type can be very easily controlled by means of notch markings arranged at the foil web, for example, or recesses or pressure marks, by means of which format changes can be very quickly carried out. If required, this can take place without interruption, whereby it is even possible in particular cases to process various formats on one and the same foil web. Furthermore, an auxiliary loop of this type ensures an additional fine adjustment in the form of a tolerance based longitudinal compensation, in which short longitudinal fluctuations are immediately and automatically corrected.

The auxiliary loop advantageously is maintained for several stages in the sequence during the transport of the foil web. Thus the overall process is accelerated by means of a shortening of the sequences times, which process is described in more detail below with the aid of description of the drawings. The auxiliary loops are maintained by means of clamping to a transport means, which ensures a reliable fixing thereof. This even permits a plurality of auxiliary loops to be simultaneously maintained, according to the subsequently occuring stages of the process.

Should the process be applied in the case of very variable format changes, the auxiliary loop can be divided into two smaller loops.

The present invention also describes an arrangement for carrying out the process, comprising a folding knife which forms the loops, also comprising two nipping jaw pairs arranged at the folding knife and clamping the foil web directly upstream and directly downstream of a loop, also comprising a pressing device which presses the sides of the loops to one another, also comprising a heating device arranged at the pressing device and also comprising a transport roller arranged at the folding knife, said transport roller being driven in sequences. For an arrangement of this type it is provided in accordance with the present invention that the transport roller is a drum having a relatively large diameter and having devices around its circumference for forming a plurality of loops and auxiliary loops.

A drum of this type permits not only the execution of the process for various formats on the foil web, but it also causes a saving of time in that the circumference of the drum goes past a plurality of control points. In a preferred embodiment of the present invention it is provided that the pressing device comprises for each loop two rotating pressing jaws which are movable in relation to one another and which rotate with the drum, said pressing jaws forming at the same time one nipping jaw for the two nipping jaw pairs, whose other nipping jaw is arranged outside of the drum, but positionable thereto.

The above mentioned positioning of the pressing jaws permits, in a simple way, the created rigidity strip to project out either forwards or backwards in transport direction of the foil web. In order to achieve this, the pressing jaws, at their areas forming the respective nipping jaw, are arranged at varying diameters of the drum. When, for example, as is seen from the description of the drawings below, the first pressing jaw in transport direction has the smaller outer diameter, the rigidity strip then projects, collar-like, forwards. When the reverse is the case, that is, the first nipping jaw in transport direction has the larger outer diameter, the rigidity strip projects, collar-like, backwards.

The application of the above mentioned drum permits all the pressing devices rotating therewith to be arranged at only one joint folding knife, arranged outside of the drum, for forming the loops. In the same way, for all the auxiliary loops there can be arranged only one joint format roller arranged outside of the drum. While there is only one function element for directly forming the loops and the auxiliary loops, there is a plurality of pressing devices for sealing the loops to one another, said pressing devices being distributed around the circumference of the drum.

For the purposes of the invention, a sector, arranged for a plurality of pressing devices and having heating devices, is arranged at the drum. Thus the sealing of the sides of the loops to one another is distributed over a plurality of stations, so that the sequence time for each individual sequence is reduced. This sequence time can be further reduced when a sector with cooling means is arranged downstream of the sector arranged for the heating elements.

These and further objects, features and advantages of the present invention will become more readily apparent from the following detailed description thereof when taken in conjunction with the accompanying schematic drawings wherein.

DETAILED DESCRIPTION OF THE DRAWINGS

With the aid of the FIGS. 1 to 4, the basic process in general form is shown, which also includes prior art.

Figures 1, 2, 3, 4, 5:
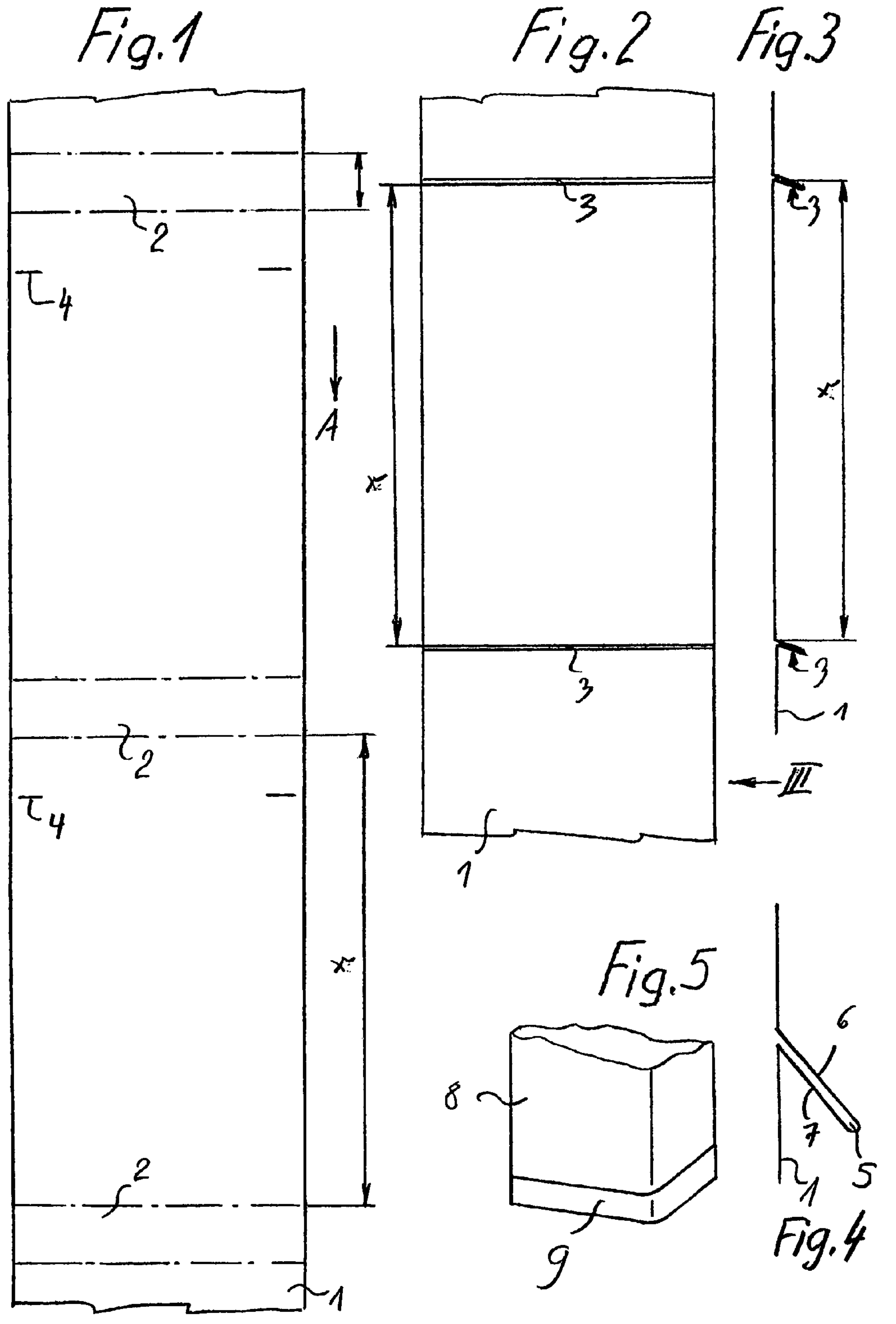
FIG. 1 is a sealable foil web with pre-marked foil sections, on which the doublelayered, collar-like projecting rigidity strips are to be formed.
FIG. 2 is the foil web according to FIG. 1, after such rigidity strips have been formed.
FIG. 3 is a view in the direction of the arrow III of FIG. 2 to illustrate the collar-like projecting rigidity strips.
FIG. 4 in greatly enlarged dimensions is a V-shaped loop which serves the formation of a rigidity strip, the sides of said V-shaped loop to be sealed to one another.
FIG. 5 is a section of a perspectively shown packaging pouch, on which a rigidity strip has been formed to a stiff, stackable edge.

According to FIG. 1, a sealable foil web 1 is transported in transport direction A through a machine installation (not shown here). Relatively narrow foil sections 2, extending transversely to the foil web 1 at clear distances x from one another, are provided on this foil web, said sections 2 being denoted in FIG. 1 only by dot-dash lines. These foil sections 2 can only be recognized for example on the foil web 1 in that they are marked by a certain color print. Rigidity strips 3 are created according to FIGS. 2 and 3 on these foil sections 2 in a way to be described below. The center of each foil section 2 can be marked on both edges of the foil web 1 by so-called notch markings 4, for example by narrow recesses or as pressure marks.

It should be mentioned here that in addition to the width of the foil web 1 being variable, the distance x between two foil sections 2 can also be varied, depending on the type of pouch-like product to be made from the foil web 1.

For the subsequent product, so-called rigidity strips 3 according to FIGS. 2 and 3 are provided, which extend transversely to the transport direction A and project from the foil web 1 in the manner of a collar. A rigidity strip 3 of this type is formed by forming a V-shaped loop 5, as can be seen in the enlarged drawing of FIG. 4. A loop 5 of this type comprises two sides 6 and 7, which are sealed together during the execution of the process and subsequently form a double-layered rigidity strip 3, which—depending on certain details involved in the production—can lean forwards or backwards in relation to the transport direction A.

A section of a packaging pouch 8 is perspectively shown in FIG. 5, which does not have any direct relation to the present invention, but which comprises in the bottom area a rigid, circular edge 9, for which the described rigidity strip 3 is provided. The rigid edge 9 serves to aid the subsequent packaging pouch 8 for example to be stacked onto an even surface. This rigid edge 9 is formed solely from the foil sections 2.

With the aid of FIG. 6, an arrangement according to the present invention for carrying out the process according to the present invention for making the rigidity strips 3 is described below.

A sealable foil web 1 can be seen, which travels through the arrangement in transport direction A, whereby at first only some already mentioned notch markings 4 are recognizable on the left-hand side of the drawing, whereas on the right-hand side several rigidity strips 3 have already formed.

The arrangement comprises a transport roller, which is designed as a drum 10 having a relatively large diameter. The drum 10 is driven in rotational direction B in sequences. The individual sequences are denoted by dot-dash, ray-like diameter lines.

Apart from the drum 10, there is a driven delivery roller pair 11 arranged upstream thereof, and a driven delivery roller pair 12 arranged downstream thereof. Furthermore, deflecting rollers 13,14, 15 and 16 are present. A compensation roller 17 is located between the delivery roller pair 11 and a deflecting roller 13, and between the deflecting roller 16 and the delivery roller pair 12 a compensation roller 18 is provided. The compensation rollers 17 and 18 serve in the known way to regulate the sag of the foil web 1, as the delivery roller pairs 11 and 12 are driven continuously, and the drum 10 is driven in sequences.

The drum 10 comprises along its circumference some of the necessary function elements for carrying out the process, while other function elements are positioned at the drum 10 but are, however, arranged outside thereof. The individual control points are denoted by the small letters a to h, at which control points the drum 10 stops for several fractions of a second each during its rotation in rotational direction B.

Along the periphery of the drum 10, eight pressing devices 19 altogether are provided which rotate with the drum 10, of which pressing devices 19, one at the control point a is shown in more detail. Each pressing device 19 comprises a fixed pressing jaw 20 and a pressing jaw 21 which is movable relative thereto. At the control points a, g, and h, the movable pressing jaw 21 is in its position having been moved away from the fixed pressing jaw 20, while at the remaining control points b to f, the respective pressing device 19 is closed.

A folding knife 22, located outside of the drum 10, is arranged at the control point a, said folding knife 22 being movable in the direction of the double arrows in a controlled way. Thus only one single folding knife 22 is provided for the drum 10. Nipping jaw pairs 23 and 24 also belong to control point a, which each consist of one pressing jaw 20 or 21, as mentioned above, as well as of an additional nipping jaw 25,26, arranged in a movable way outside of the drum 10. The nipping jaws formed by the pressing jaws 20 and 21 rotate with the drum 10, while the nipping jaws 25 and 26 located outside of the drum 10 can be positioned to the pressing jaws 20 and 21 or lifted therefrom according to the direction of the double arrows, thus forming from time to time the above mentioned nipping jaw pairs 23 and 24.

At control point a there is finally a so-called format roller 28, which can be directed in the direction of the double arrow, namely by means of scanning the above mentioned notch markings 4. The format roller 28 generates on the circumference of the drum 10 an auxiliary loop 27, which is arranged at the loop 5 which forms the rigidity strip 3 and which auxiliary loop 27 is maintained during one rotation of the drum 10, even when the format roller 28 is withdrawn from the circumference of the drum 10 immediately after the auxiliary loop 27 has been formed. The auxiliary loop 27 is formed depending on the distances x between the foil sections 2, whereby with increasing distance x, the auxiliary loop 27 also increases in size.

The application of this auxiliary loops 27 makes the arrangement independent of the format, so that one and the same drum 10 can process foil webs 1 comprising different distances x between the foil sections 2 without the remaining function elements having to be disassembled and exchanged for other function elements. The stages of the process at the individual control points a to h are described below, in particular those at the control point a, as a large percentage of the procedural steps are carried out there.

At the control point a, the folding knife 22 is driven between the pressing jaws 20 and 21 of the opened pressing device 19 thus forming a loop 5. Almost simultaneously thereafter, the format roller 28 is placed in position, whereby an auxiliary loop 27 is formed which is arranged adjacent at the loop 5. In order to secure this state, the nipping jaws 25 and 26 are moved to the pressing jaws 20 and 21. Thus the folding knife 22 as well as the format roller 28 can be withdrawn from the circumference of the drum 10. In this state, the nipping jaw 25 is disposed on the pressing jaw 20 and the nipping jaw 26 on the pressing jaw 21. The pressing jaw 21 is now positioned on the pressing jaw 20, whereby the sides 6 and 7 of the loop 5 are pressed closely together, but not yet sealed. As the pressing device 19 is now closed, the nipping jaws 25 and 26 of the nipping jaw pairs 23 and 24 can now be released again.

In this state, which denotes the end of the sequence at the control point a, the loop 5 is thus clamped by the pressing device 19, while the auxiliary loop 27 is left to its own devices, which, however, does not disturb the process, as the foil web 1 has been clamped in a similar way at the previous control point b.

During the sequenced rotation in direction B, the pressing devices 19 remain closed and are only opened at the control point g. Between two pressing devices 19 is located an auxiliary loop 27 which hangs independently downwards.

Figure 6:
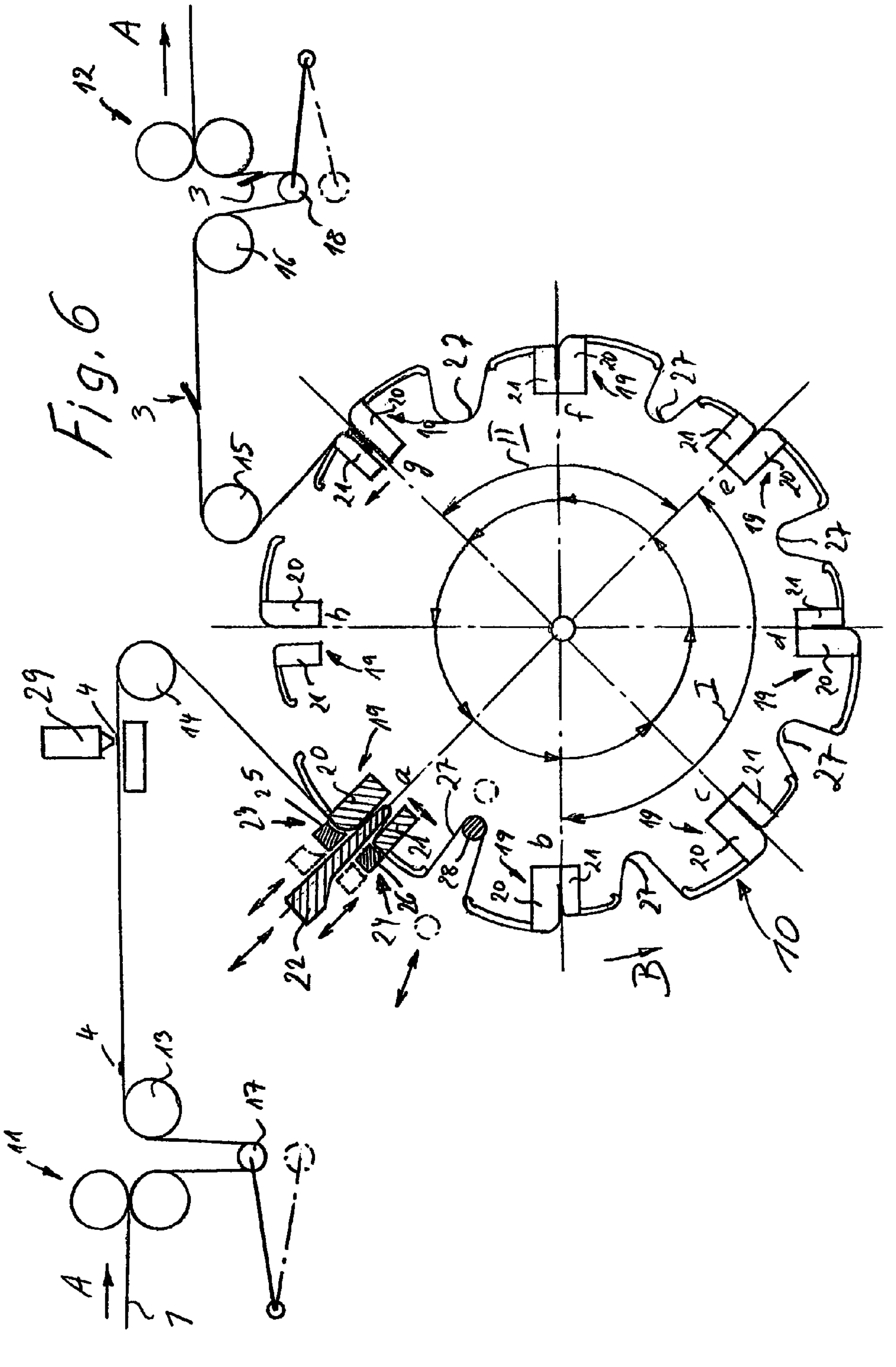
FIG. 6 is a very schematic drawing of an arrangement for carrying out the process for applying rigidity strips to a sealable foil web, comprising a transport drum according to the present invention.

In FIG. 6, a sector I is denoted by a circular-shaped double arrow. In this sector I, which is located between the control points b and e, the pressing devices 19 are heatable by means of a heating device (not shown). The pressed loops 5 are thus heated in stages while the drum 10 continues to rotate. Following sector I is sector II, which is located between the control points e and g and in which the sealed loops 5 are cooled, so that the entire sequenced process takes place at a faster pace. The process, in particular the formation of the auxiliary loops 27, is controlled by a sensor 29, which preferably scans the edges of the foil web 1 and, depending on the position of the notch markings 4, controls the format roller 28 with regard to its sag. The embodiment of the arrangement described here permits therefore the positioning of a controlled auxiliary loop 27 at each foil section 2 at which a loop 5 is formed, which auxiliary loop 27 serves the adaptation to format changes with regard to the distances x between the foil sections 2. The auxiliary loop 27 is controlled by the notch markings 4 of the foil web 1. An auxiliary loop 27 is maintained during the transport of the foil web 1 along the periphery of the drum 10 for a plurality of sequences, namely by means of clamping to the single pressing devices 19. As can be seen, a plurality of loops 5 and auxiliary loops 27 are maintained simultaneously. With the aid of FIG. 6, it could be seen that the movable pressing jaws 21 have a smaller outer diameter than the stationarily arranged nipping jaws 20. In an arrangement of the pressing devices 19 of this kind, the formed rigidity strips 3 are aligned in transport direction A in relation to the foil web 1.

Figure 8:
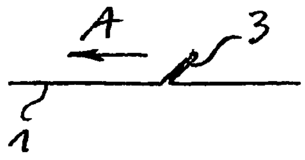
FIG. 8 is a rigidity strip, projecting backwards, created by the pressing device of FIG. 7.
Figure 7:
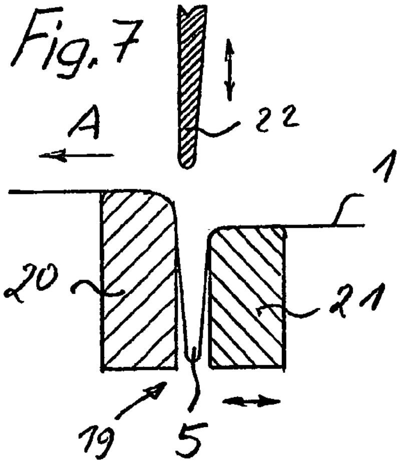
FIG. 7 in enlarged dimensions is a section from FIG. 6, in the area of a folding knife and a pressing device arranged to a loop.

Should it be required that the individual rigidity strips 3 project backwards from the foil web 1, collar-like and in the opposite direction to the transport direction A, then the pressing device 19 can be designed accordingly as shown in FIG. 7. It can be seen that in the case of this variation, the first stationary pressing jaw 20 in transport direction A has a larger diameter than the movable pressing jaw 21 arranged downstream thereof. Thus, during pressing and subsequent sealing of the loops 5, rigidity strips 3 form, which project backwards, collar-like from the foil web 1 as shown in FIG. 8.

Figure 9:
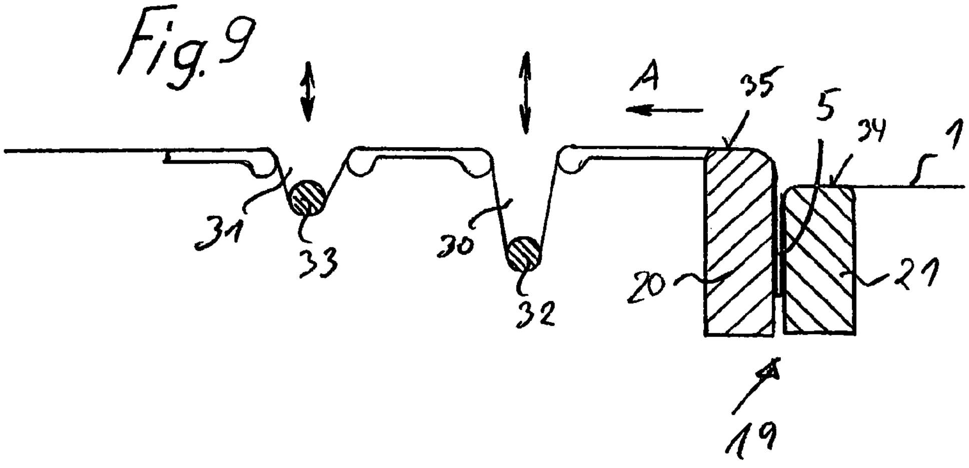
FIG. 9 in a developed view of the circumference of the drum is an embodiment having a plurality of auxiliary loops.

FIG. 9 shows in a developed view a section from FIG. 6, with the feature that the auxiliary loops 27 shown in FIG. 6 are divided into two loops 30 and 31, as shown in FIG. 9. This embodiment is then purposeful when particularly complicated format changes on one and the same drum 10 regarding the distances x are to be carried out. It can then be practical to provide a plurality of auxiliary loops 30 and 31 for one loop 5, to each of which a format roller 32 and 33 is arranged.

In FIG. 9 it can be seen that the pressing jaws 21 and 20 each have an area 34 and 35 on their outer diameters, at which areas, according to the description of FIG. 6, the nipping jaws 25 and 26 (not shown in FIG. 9) can be positioned at the control point a.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for making a foil web for use in producing packages, comprising:

transporting a sealable foil web in sequential transport steps in a web transport direction, forming v-shaped loops in the foil web at predetermined foil sections spaced from one another in the web transport direction, sealing sides of the v-shaped loops to one another to form rigidity strips which extend collar-like from the web transversely to the web transport direction, and forming controlled auxiliary loops in each foil section in which a v-shaped loop is formed, said auxiliary loops serving to accommodate for different lengths of the respective foil sections.

2. A process according to claim 1, wherein said forming controlled auxiliary loops includes providing markings in the foil web indicative of the length of respective foil sections, and controlling the size of the auxiliary loops in response to detection of said markings.

3. A process according to claim 1, comprising maintaining respective auxiliary loops during a plurality of sequential transport steps.

4. A process according to claim 2, comprising maintaining respective auxiliary loops during a plurality of sequential transport steps.

5. A process according to claim 3, wherein said maintaining of the respective auxiliary loops includes clamping the respective auxiliary loops to a transport device carrying out the transporting of the foil web.

6. A process according to claim 5, comprising simultaneously maintaining a plurality of said auxiliary loops during transport of the foil web with the transport device.

7. A process according to claim 1, wherein the respective auxiliary loops each include a plurality of loop sections.

8. A process according to claim 1, wherein said transporting the foil web includes clamping the foil web to a transport roller which also carries mechanisms for forming the v-shaped loops and auxiliary loops.

9. Apparatus for making a foil web for use in producing packages, comprising:

transport means for transporting a sealable foil web in sequential transport steps in a web transport direction, loop forming means for forming v-shaped loops in the foil web at predetermined foil sections spaced from one another in the web transport direction, sealing means for sealing sides of the v-shaped loops to one another to form rigidity strips which extend collar-like from the web transversely to the web transport direction, and auxiliary loop forming means for forming controlled auxiliary loops in each foil section in which a v-shaped loop is formed, said auxiliary loops serving to accommodate for different lengths of the respective foil sections.

10. Apparatus for performing a process for making a foil web for use in producing packages by transporting a sealable foil web in sequential transport steps in a web transport direction, forming v-shaped loops in the foil web at predetermined foil sections spaced from one another in the web transport direction, sealing sides of the v-shaped loops to one another to form rigidity strips which extend collar-like from the web transversely to the web transport direction, and forming controlled auxiliary loops in each foil section in which a v-shaped loop is formed, the apparatus comprising:

a joint folding knife which forms the v-shaped loops, two nipping jaw pairs arranged at the folding knife and clamping the foil web directly upstream and directly downstream of a respective one of the v-shaped loops, a pressing device which presses the sides of the loops toward one another, a heating device arranged at the pressing device, and a transport roller arranged at the folding knife and driven in sequences, wherein the transport roller is a drum having a diameter and comprising devices along its circumference for forming a plurality of v-shaped loops and auxiliary loops, said auxiliary loops serving to accommodate for different lengths of the respective foil sections.

11. Apparatus according to claim 10, wherein the pressing device comprises for each v-shaped loop two pressing jaws which rotate with the drum and which are movable in relation to one another, which pressing jaws form at the same time each a nipping jaw for the two nipping jaw pairs, whose other nipping jaws are arranged outside of the drum while being arrangeable to the drum.

12. Apparatus according to claim 11, wherein the pressing jaws are arranged with their areas forming the respective nipping jaw at various diameters of the drum.

13. Apparatus according to claim 10, wherein the joint folding knife, arranged outside of the drum, is provided for all the pressing devices.

14. Apparatus according to claim 10, wherein a joint format roller, arranged outside of the drum, is positioned for forming all the auxiliary loops.

15. Apparatus according to claim 11, wherein a joint format roller, arranged outside of the drum, is positioned for forming all the auxiliary loops.

16. Apparatus according to claim 15, wherein a sector of the drum includes a plurality of pressing devices and associated heating devices.

17. Apparatus according to claim 16, wherein a sector of the drum comprise cooling means arranged downstream of the sector.

18. Apparatus according to claim 10, wherein the auxiliary loop is controlled by means of notch markings in the foil web, and wherein at least one sensor for scanning the notch markings of the foil web is arranged at the drum.

* * * * *